United States Patent [19]

Sugiyama

[11] Patent Number: 5,467,278

[45] Date of Patent: Nov. 14, 1995

[54] ELECTRIC CONTROL APPARATUS FOR FOUR-WHEEL STEERING SYSTEM

[75] Inventor: Mizuho Sugiyama, Toyota, Japan

[73] Assignee: Toyota Jidosha Kabushiki Kaisha, Toyota, Japan

[21] Appl. No.: 13,979

[22] Filed: Feb. 5, 1993

[30] Foreign Application Priority Data

Feb. 5, 1992 [JP] Japan .................................. 4-020144

[51] Int. Cl.⁶ .................................. B62D 6/00; B62D 5/04
[52] U.S. Cl. .................................. 364/424.05; 180/79.1; 180/140; 280/91
[58] Field of Search ............... 364/424.05; 180/79.1, 180/140, 141, 142; 280/91

[56] References Cited

U.S. PATENT DOCUMENTS

| | | | |
|---|---|---|---|
| 4,527,654 | 7/1985 | Shibahata et al. | 180/140 |
| 4,700,960 | 10/1987 | Miki et al. | 280/91 |
| 4,878,557 | 11/1989 | Shibahata et al. | 180/140 |
| 4,942,532 | 7/1990 | Mori | 364/424.05 |
| 5,136,507 | 8/1992 | Shiraishi et al. | 364/424.05 |
| 5,150,764 | 9/1992 | Eguchi et al. | 180/141 |
| 5,274,555 | 12/1993 | Fukunaga et al. | 364/424.05 |
| 5,285,390 | 2/1994 | Haseda et al. | 364/424.05 |

FOREIGN PATENT DOCUMENTS

| | | |
|---|---|---|
| 0150856 | 8/1985 | European Pat. Off. |
| 60-124572 | 7/1985 | Japan . |
| 60-161255 | 8/1985 | Japan . |
| 60-44185 | 10/1985 | Japan . |
| 62-191272 | 8/1987 | Japan . |

*Primary Examiner*—Kevin J. Teska
*Assistant Examiner*—Collin W. Park
*Attorney, Agent, or Firm*—Cushman, Darby & Cushman

[57] ABSTRACT

An electric control apparatus for a four-wheel steering system of an automotive vehicle having a front wheel steering mechanism for a set of dirigible front road wheels and a rear wheel steering mechanism for a set of dirigible rear road wheels, which includes a yaw rate sensor arranged to detect an actual yaw rate of the vehicle for producing a detection signal indicative of the actual yaw rate, and a microcomputer programmed to determine a target steering angle of the rear road wheels in proportion to a high-frequency component of the actual yaw rate for producing a control signal indicative of the target steering angle and to apply the control signal to an electrically operated actuator of the rear wheel steering mechanism so that the rear road wheels are steered at the target steering angle.

3 Claims, 5 Drawing Sheets

5,467,278

ELECTRIC CONTROL APPARATUS FOR FOUR-WHEEL STEERING SYSTEM

BACKGROUND OF THE INVENTION

1. Field of the Invention

The present invention relates to a four-wheel steering system for automotive vehicles, more particularly to an electric control apparatus for a rear wheel steering mechanism in the four-wheel steering system for controlling a set of dirigible rear road wheels in accordance with a yaw rate of the vehicle.

2. Discussion of the Prior Art

Disclosed in Japanese Patent Laid-open Publication No. 60-161255 is an electric control apparatus for a rear wheel steering mechanism which includes a yaw rate sensor arranged to detect a yaw rate of the vehicle for conducting steerage of a set of dirigible rear road wheels in proportion to the detected yaw rate. Under control of the control apparatus, however, the rear road wheels are steered in the same direction as the front road wheels in steady-state cornering of the vehicle. This decreases the yaw rate gain, resulting in deterioration of the maneuverability of the vehicle.

SUMMARY OF THE INVENTION

It is, therefore, a primary object of the present invention to provide an electric control apparatus for the rear wheel steering mechanism capable of enhancing the maneuverability of the vehicle in its steady-state cornering without causing any deterioration in the travel stability.

According to the present invention, the object is accomplished by providing an electric control apparatus for a four-wheel steering system of an automotive vehicle having a front wheel steering mechanism for a set of dirigible front road wheels and a rear wheel steering mechanism for a set of dirigible rear road wheels, which comprises yaw rate detection means for detecting an actual yaw rate of the vehicle and for producing a detection signal indicative of the actual yaw rate; means responsive to the detection signal for obtaining a high-frequency component of the actual yaw rate; control means for determining a target steering angle of the rear road wheels in proportion to the high-frequency component of the actual yaw rate and for producing a control signal indicative of the target steering angle; and means for applying the control signal to an electrically operated actuator of the rear wheel steering mechanism so that the rear road wheels are steered at the target steering angle.

In a preferred embodiment, the means responsive to the detection signal comprises means for calculating a low-frequency component of the actual yaw rate by execution of a low-pass filter calculation and for subtracting the low-frequency component from the actual yaw rate.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
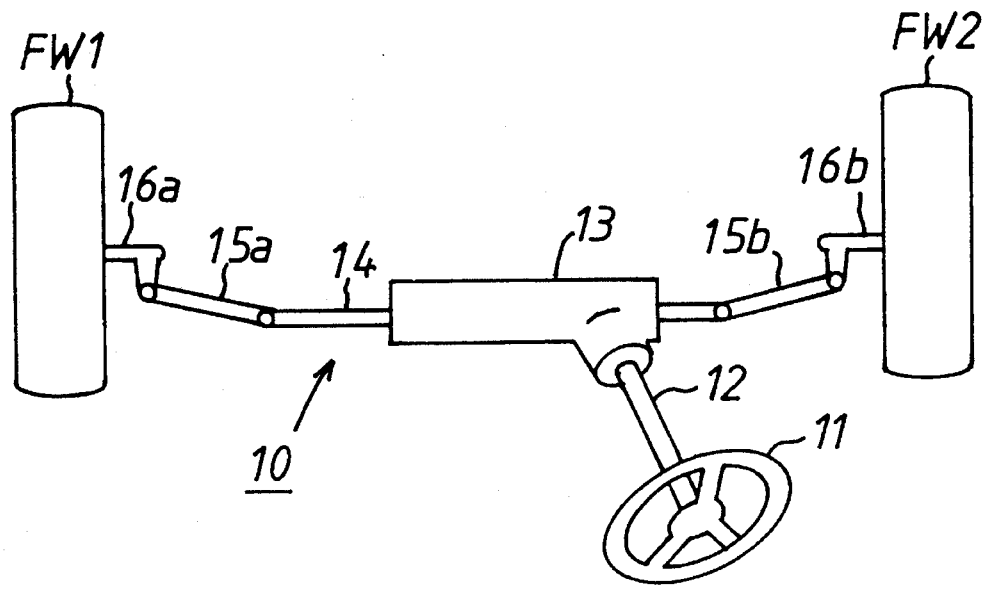
FIG. 1 is a schematic illustration of a four-wheel steering system of an automotive vehicle.
Figure 1:
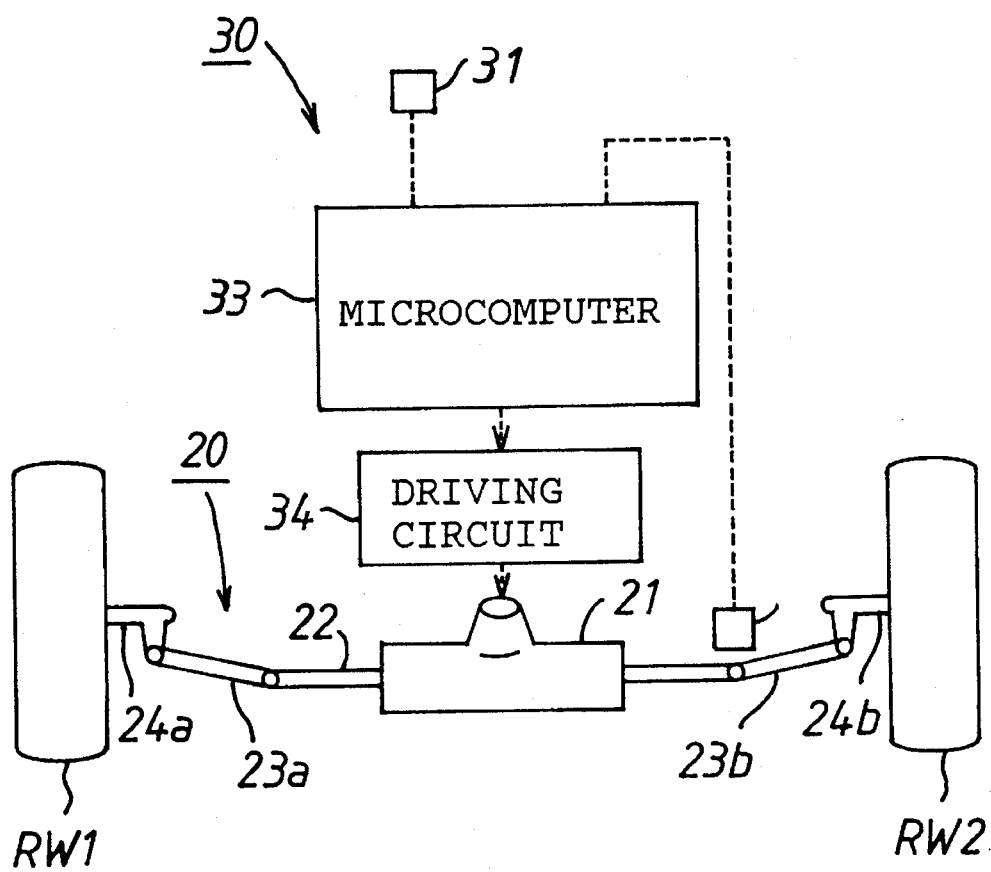

In FIG. 1 of the drawings, there is schematically illustrated a four-wheel steering system of an automotive vehicle which includes a front wheel steering mechanism 10 for a set of dirigible front road wheels FW1, FW2, a rear wheel steering mechanism 20 for a set of dirigible rear road wheels RW1, RW2, and an electric control apparatus 30 for the rear wheel steering mechanism 20.

The front wheel steering mechanism 10 includes a steering shaft 12 provided at its upper end with a steering wheel 11 and connected at its lower end to a rack bar 14 which is axially displaceably mounted within a steering gear box 13. The rack bar 14 is connected at its opposite ends to the front road wheels FW1, FW2 by means of a pair of tie rods 15a, 15b and a pair of knuckle arms 16a, 16b. In operation of the steering wheel 11, the rack bar 14 is axially displaced to steer the front road wheels FW1, FW2, and the displacement amount of rack bar 14 is defined by a predetermined gear ratio at the gear box 13. The rear wheel steering mechanism 20 includes an electrically operated actuator 21 which is arranged to effect axial displacement of a relay rod 22. The relay rod 22 is connected at its opposite ends to the rear road wheels RW1, RW2 by means of a pair of tie rods 23a, 23b and a pair of knuckle arms 24a, 24b to steer the rear road wheels in accordance with axial displacement thereof.

The electric control apparatus 30 includes a microcomputer 33 connected to a yaw rate sensor 31 and a rear wheel steering angle sensor 32. The yaw rate sensor 31 is arranged to detect a rotational speed of the vehicle about a vertical axis for producing a detection signal indicative of a yaw rate γ of the vehicle. The rear wheel steering angle sensor 32 is arranged to detect an axial displacement amount of the relay rod 22 for producing a detection signal indicative of a steering angle θr of the rear road wheels RW1, RW2. In this embodiment, the yaw rate γ and the rear wheel steering angle θr each are represented by a positive value in a rightward direction and by a negative value in a leftward direction. The microcomputer 33 includes a central processing unit or CPU, a read-only memory or ROM, a random access memory or RAM, and an input/output device or I/O. The ROM of computer 33 is arranged to memorize a control program shown by a flow chart in FIG. 2. The computer 33 is connected to a driving circuit 34 which is arranged to activate the actuator 21 in accordance with a control signal applied thereto from the computer 33.

Figure 2:
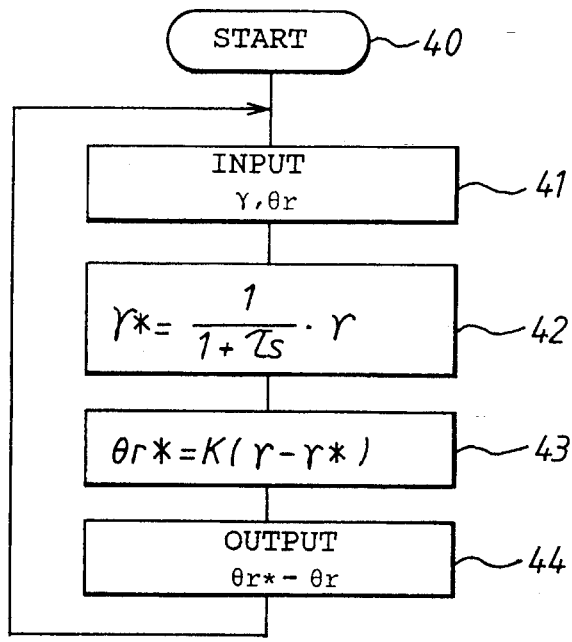
FIG. 2 is a flow chart of a control program executed by a microcomputer shown in FIG. 1.
Figure 3:
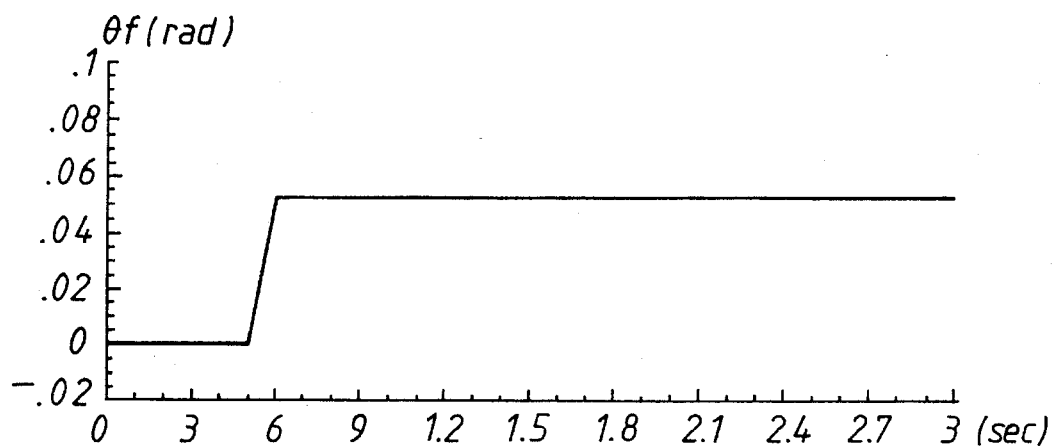
FIG. 3 is a graph showing a sudden change of the steering angle of the front road wheels.

Assuming that an ignition switch (not shown) of the vehicle is closed, the computer 33 initiates execution of the control program at step 40 shown in FIG. 2 and repeatedly executes processing at step 41 to 44 for controlling steerage of the rear road wheels RW1, RW2. In such execution of the control program, the CPU of computer 33 reads out at step 41 a yaw rate γ of the vehicle and a steering angle θr of the rear road wheels in response to detection signals applied from sensors 31 and 32 and calculates at step 42 a low frequency component γ* of the detected actual yaw rate γ by execution of a low-pass filter calculation or a primary delay calculation described below.

$$\gamma^* = \frac{1}{1+\tau s} \cdot \gamma$$

where the character τ is a predetermined time constant, and the character s is a laplace operator.

After calculation of the low-frequency component γ* of the detected actual yaw rate γ, the CPU of computer 33 calculates at step 43 a target steering angle θr* of the rear road wheels in proportion to a difference between the yaw rate γ and its low-frequency component γ* on a basis of the following equation.

$$\gamma r^* = K \cdot (\gamma - \gamma^*)$$

where K is a proportional constant, and the subtraction part represents a high-frequency component of the yaw rate γ. At the following step 44, the CPU of computer 33 produces a control signal indicative of a deviation (θr*−θr) between the target steering angle and the detected actual steering angle of the rear road wheels. When applied with the control signal from the computer 33, the driving circuit 34 produces a drive signal defined by the control signal therefrom and applies it to the actuator 21. Thus, the actuator 21 is activated to displace the relay rod 22 leftward or rightward in accordance with the deviation between the target steering angle θr* and the detected actual steering angle θr thereby to steer the rear road wheels RW1, RW2 at the target steering angle θr*.

Assuming that in such steering operation the vehicle has been applied with crosswind in a transition period for turning, an absolute value |γ−γ*| of the high-frequency component of the yaw rate becomes a large value. In steady-state cornering of the vehicle, however, the absolute value |γ−γ*| is maintained approximately in zero. As a result, the rear road wheels RW1, RW2 are steered in the same direction as the rotational direction of the detected actual yaw rate when applied with the crosswind. This is effective to enhance the travel stability of the vehicle. In the steady-state cornering of the vehicle, the rear road wheels RW1, RW2 are not steered to enhance the maneuverability of the vehicle. Even if the zero point of the yaw rate sensor 31 is drifted by change of the ambient temperature, the high-frequency component of the detected actual yaw rate does not include any drift component therein since the drift will constantly occur. Thus, the steerage of the rear road wheels can be more precisely controlled without any influence of the drift. Since any differential value of the yaw rate γ is not utilized in this embodiment, the steerage of the rear road wheels can be stabilized without any influence caused by noises of the yaw rate sensor 31.

For substantiation of the foregoing useful effects, illustrated in FIGS. 3 to 8 is a result of simulation of response characteristics of a yaw rate γ, a slip angle β of the vehicle, a lateral acceleration speed Gx, a steering angle θr of the rear road wheels, a roll angle speed dθ roll/dt and a roll angle θ roll in a condition where the steering angle θf of the front road wheels has been steppedly changed. In FIGS. 4 to 8, a result of the control rule according to the present invention is shown by a solid line, a result of the yaw rate proportional control in the prior art is shown by a broken line, and a result of two wheel steering control is shown by a two-dots and dash line.

From the simulation result, the following fact will be understood.

Figure 4:
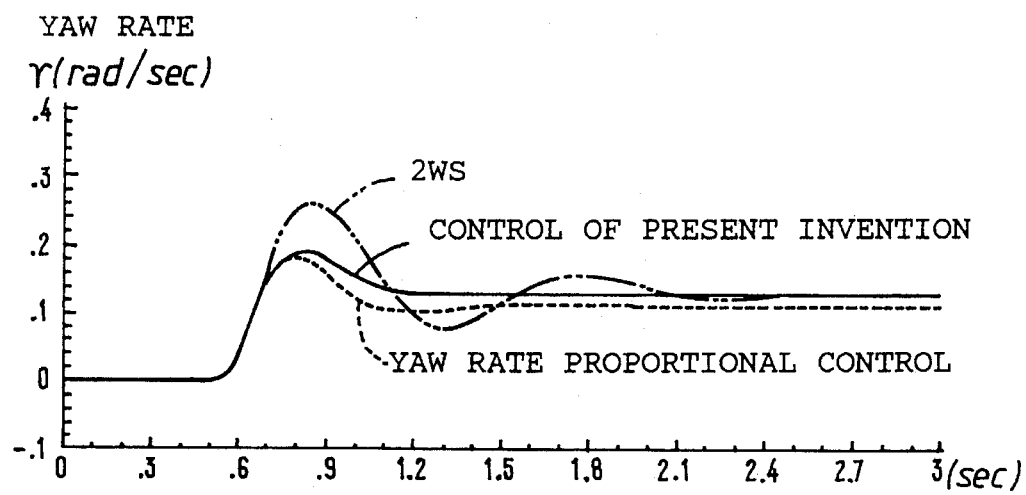
FIG. 4 is a graph showing a response characteristic of a yaw rate of the vehicle in the sudden change of the steering angle of the front road wheels.

1) As shown in FIG. 4, a steady-state yaw rate γ according to the control rule of the present invention becomes approximately equal to that in the two wheel steering and larger than that in the yaw rate proportional control. The convergency of the steady-state yaw rate γ becomes substantially the same as that in the yaw rate proportional control.

Figure 5:
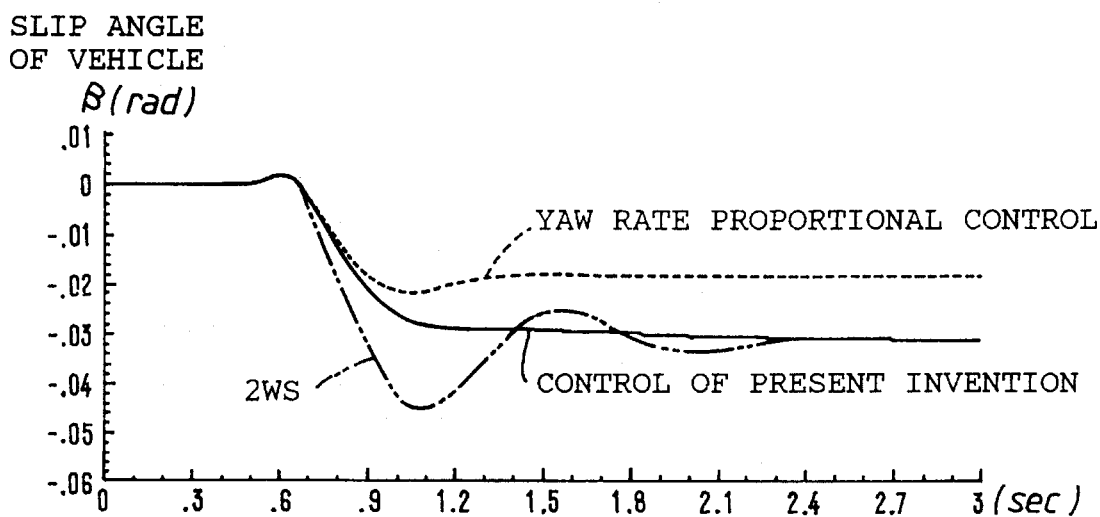
FIG. 5 is a graph showing a response characteristic of a slip angle of the vehicle in the sudden change of the steering angle of the front road wheels.

2) As shown in FIG. 5, the slip angle β of the vehicle in the steady-state according to the control rule of the present invention becomes approximately equal to that in the two wheel steering and larger than that in the yaw rate proportional control. The convergency of the slip angle β becomes better than that in the yaw rate proportional control.

Figure 6:
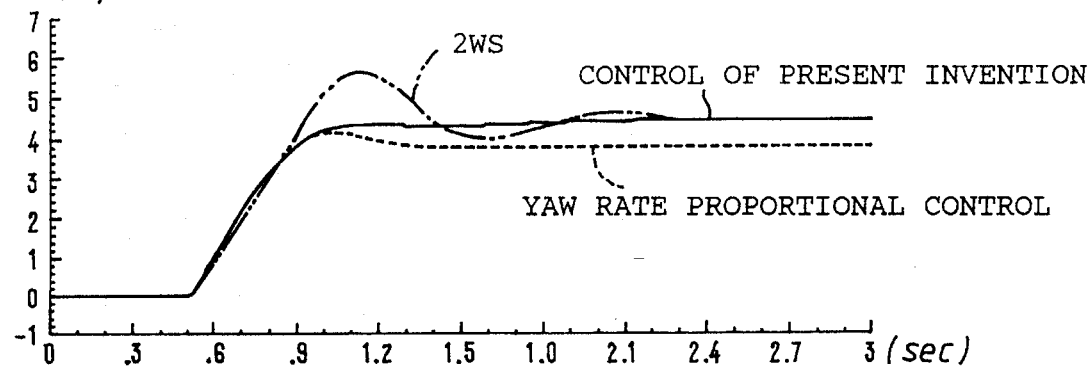
FIG. 6 is a graph showing a response characteristic of a lateral acceleration of the vehicle in the sudden change of the steering angle of the front road wheels.

3) As shown in FIG. 6, the lateral acceleration speed Gx in the steady-state according to the control rule of the present invention becomes approximately equal to that in the two wheel steering and larger than that in the yaw rate proportional control. The convergency of the lateral acceleration speed Gx becomes better than that in the yaw rate proportional control.

Figure 7:
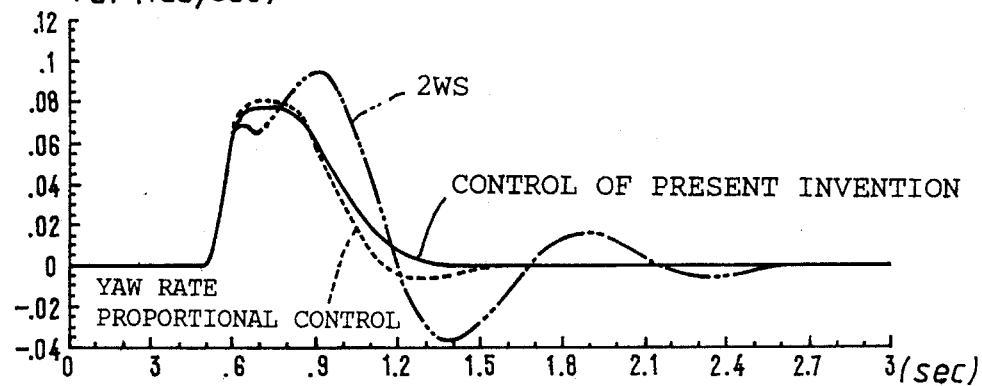
FIG. 7 is a graph showing a response characteristic of a roll angle speed of the vehicle in the sudden change of the steering angle of the front road wheels.

4) As shown in FIG. 7, the roll angle speed dθ roll/dt according to the control rule of the present invention becomes approximately equal to that in the yaw rate proportional control and smaller than that in the two wheel steering. The convergency of the roll angle speed becomes better than that in the yaw rate proportional control.

Figure 8:
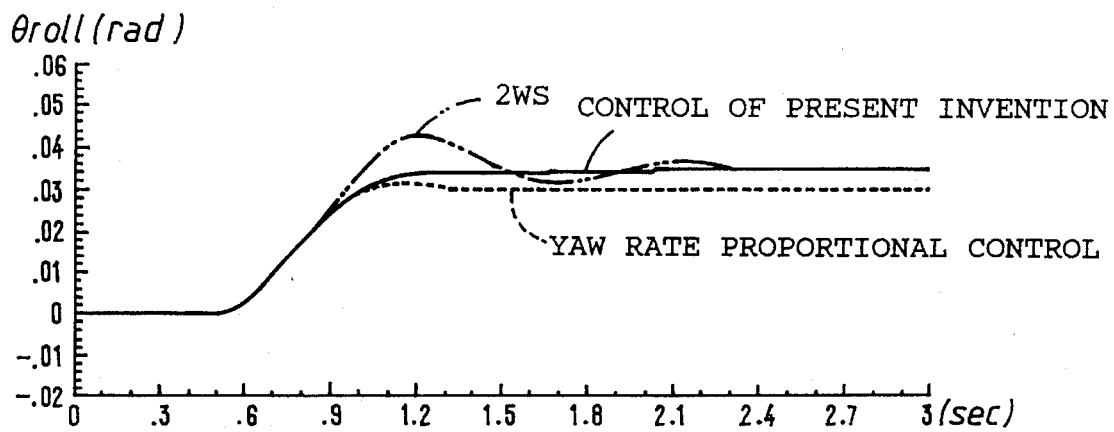
FIG. 8 is a graph showing a response characteristic of a roll angle of the vehicle in the sudden change of the steering angle of the front road wheels.

5) As shown in FIG. 8, the roll angle θ roll in the steady-state according to the control rule of the present invention becomes approximately equal to that in the two wheel steering and larger than that in the yaw rate proportional control. The convergency of the roll angle θ roll becomes better than that in the yaw rate proportional control.

Figure 9:
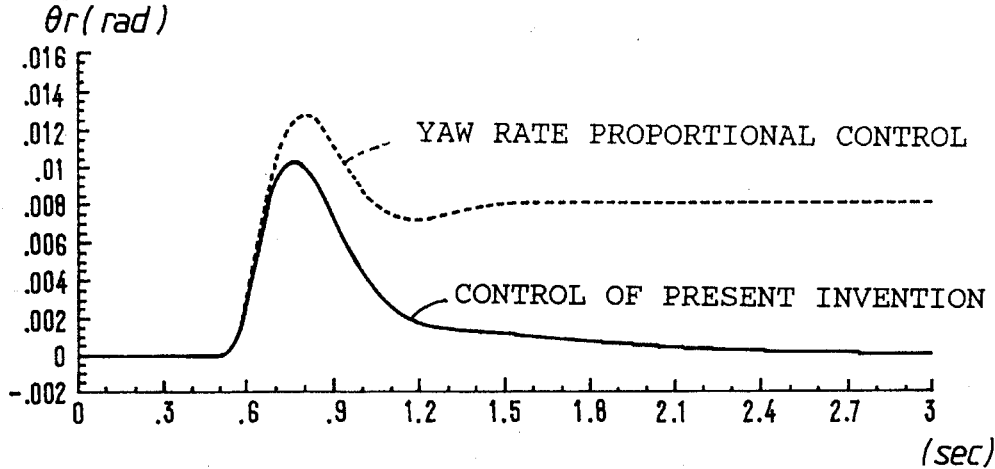
FIG. 9 is a graph showing a steering angle of the rear road wheels.

6) As shown in FIG. 9, the steering angle θr of the rear road wheels according to the control rule of the present invention is defined to be smaller than that in the yaw rate proportional control. Thus, it is expected that the control effect of the rear road wheels is maximized at a maximum steering angle of the rear road wheels.

Although in the above embodiment, the low-frequency component γ* of the detected actual yaw rate has been calculated by processing of the low-pass filter calculation or primary delay calculation during execution of the control program, the low-frequency component γ* may be obtained by a hardware in such a manner that an output of the yaw rate sensor 31 is applied to the microcomputer 33 through a low-pass filter or a primary delay filter to be replaced with a resultant of calculation at step 42 of the control program.

In addition, the high-frequency component γ−γ* of the actual yaw rate may be directly calculated by processing of a high-pass filter calculation of the actual yaw rate. In such a case, the high-pass filter calculation of the actual yaw rate is processed at step 42 of the control program, and a resultant of the calculation is multiplied by the constant coefficient K at step 43. Furthermore, the high-frequency component of the actual yaw rate may be obtained by a hardware in such a manner that an output of the yaw rate sensor 31 is applied to the microcomputer 33 through a high-pass filter to be multiplied by the constant coefficient K at step 43 of the control program.

What is claimed is:

1. An electric control apparatus for a four-wheel steering system of an automotive vehicle having a front wheel steering mechanism for a set of dirigible front road wheels and a rear wheel steering mechanism for a set of dirigible rear road wheels, comprising:

yaw rate detection means for detecting an actual yaw rate of the vehicle and for producing a detection signal indicative of the actual yaw rate;

means responsive to the detection signal for obtaining a high-frequency component of the actual yaw rate and for defining an absolute value of the high-frequency component to be increased in a transition period for turning of the vehicle and to be maintained approximately at zero in steady-state cornering the vehicle;

control means for determining a target steering angle of the rear road wheels in proportion to the high-frequency component of the actual yaw rate and for producing a control signal indicative of the target steering angle; and means for applying the control signal to an electrically operated actuator of said rear wheel steering mechanism so that the rear road wheels are steered at the target steering angle.

2. An electric control apparatus as recited in claim 1, wherein said means responsive to the detection signal comprises means for calculating a low-frequency component of the actual yaw rate by execution of a low-pass filter calculation and for subtracting the low-frequency component from the actual yaw rate.

3. An electric control apparatus as recited in claim 1, wherein said means responsive to the detection signal comprises means for directly calculating a high-frequency component of the actual yaw rate by execution of a high-pass filter calculation.

* * * * *